(No Model.) 2 Sheets—Sheet 1.
G. W. CRUMLY.
MACHINE FOR DRIVING FENCE POSTS, &c.
No. 564,505. Patented July 21, 1896.
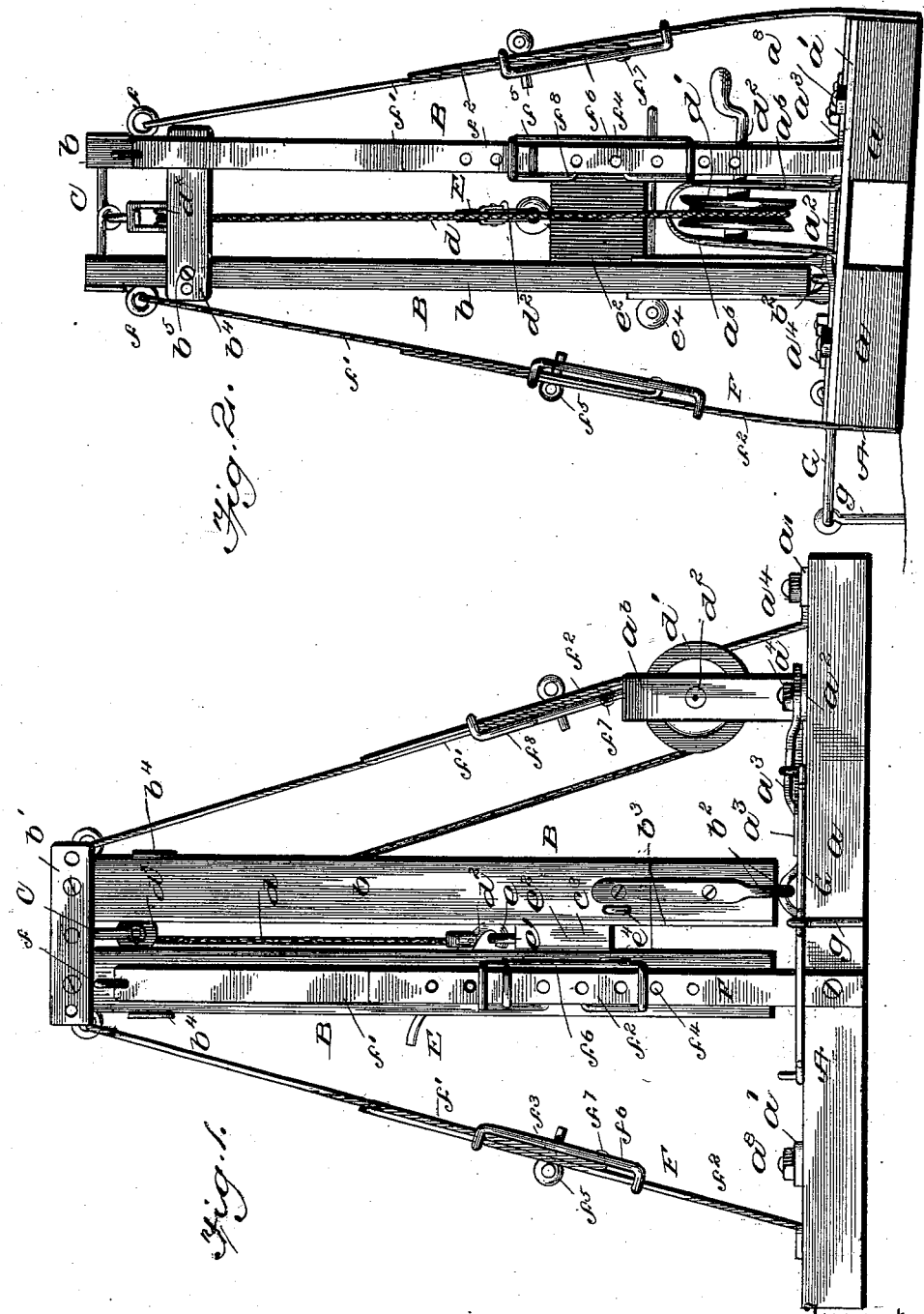
Witnesses
Inventor
Attorney (No Model.) 2 Sheets—Sheet 2.

G. W. CRUMLY.
MACHINE FOR DRIVING FENCE POSTS, &c.

No. 564,505. Patented July 21, 1896.

Witnesses

Inventor
George W. Crumly,
By
Attorney

THE NORRIS PETERS CO., PHOTO-LITHO., WASHINGTON, D. C.

UNITED STATES PATENT OFFICE.

GEORGE WASHINGTON CRUMLY, OF ROME, GEORGIA.

MACHINE FOR DRIVING FENCE-POSTS, &c.

SPECIFICATION forming part of Letters Patent No. 564,505, dated July 21, 1896.

Application filed March 30, 1896. Serial No. 585,413. (No model.)

*To all whom it may concern:*

Be it known that I, GEORGE WASHINGTON CRUMLY, of Rome, in the county of Floyd and State of Georgia, have invented certain new and useful Improvements in Machines for Driving Fence-Posts, &c.; and I do hereby declare the following to be a full, clear, and exact description of the invention, such as will enable others skilled in the art to which it appertains to make and use the same.

This invention relates to machines for driving fence-posts, piles, or the like, being especially designed for use upon hilly or uneven ground.

The object of the invention is, primarily, to produce a machine of the character specified in which the guides for the power-hammer can always be maintained in a vertical or upright position, no matter what the surface of the ground may be, whereby a fence-post may be quickly and accurately placed in position.

A further object is to provide a machine which is capable of adjustment, so as to be capable of operating on posts of various diameters.

The invention will be hereinafter fully set forth, and particularly pointed out in the claims.

Figure 3:
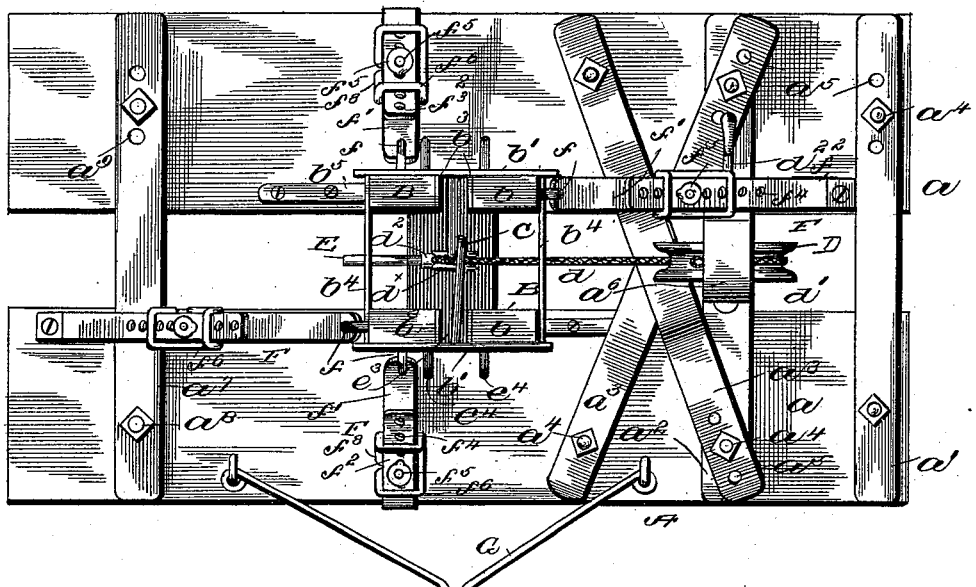
Figure 4:
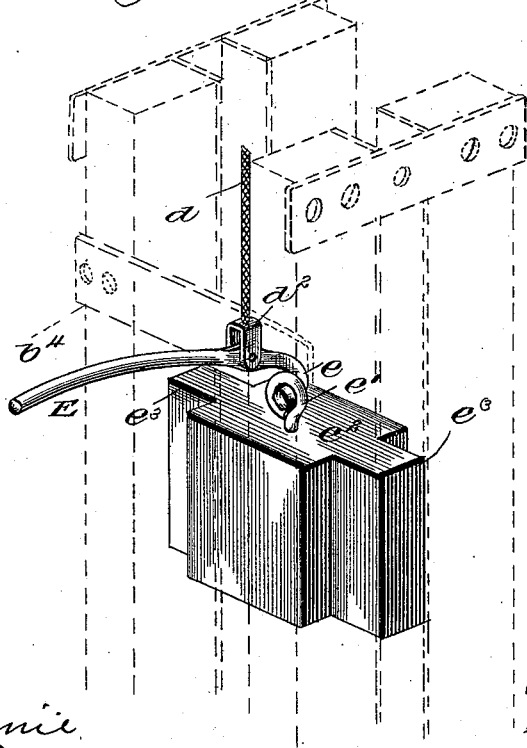

In the accompanying drawings, Figure 1 is a view in side elevation. Fig. 2 is a front elevation illustrating the machine in use on a hillside. Fig. 3 is a top plan view. Fig. 4 is an enlarged detail.

Referring to the drawings, A designates the base or platform, which is composed of two parallel bars $a$ adjustably connected together by means of brace-plates $a'$, $a^2$, and $a^3$, secured to said bars by nutted bolts $a^4$. Each of the brace-plates is provided with a series of holes $a^5$ to permit of the bars $a$ being moved closer together or farther away from each other, according to the diameter of the posts to be driven "home." The brace-plates $a^3$ are arranged in the shape of an X, and their free ends in which the holes are formed overlap the ends of the plate $a^2$, which ends are all held by two bolts. The brace-plate $a^2$ is bowed at its center, as at $a^6$. Near the forward end of the platform is an additional brace-plate $a^7$, which is removably held by bolts $a^8$, said plate at one end being provided with a series of holes $a^9$ to permit the plate to accommodate itself to the adjustment of the base. This plate is readily removed as the machine is moved forward from one post to the other.

B B designate two parallel guideways extending upwardly from the platform and with their inner opposed faces in line with the inner opposite edges of bars $a$. Each guideway consists of two vertically-arranged posts or uprights $b$, connected together at their upper ends by a plate $b'$, while at their lower ends they are pivotally connected to the platform-bars, preferably by interlocking straps $b^2$. The opposite edges of the two posts have metallic strips $b^3$ attached thereto. The two guideways B are connected by adjustable plates $b^4$, held by screws $b^5$, said plates having each a series of holes to accommodate said screws.

C is a cross-rod extending between the two guideways and supported by the plates $b'$. At its center this cross-rod supports a pulley D, over which is passed a rope or chain $d$, which at one end is connected to the periphery of a grooved drum $d'$, whose crank-shaft $d^2$ is supported by the bowed portion $a^6$ of brace-plate $a^2$, in which said drum is located. The other end of this rope or chain is connected to a pivoted bail $d^3$ of an arm E. This arm is curved, and at one end is formed into a hook $e$, which is designed to engage an eye $e'$ of a weight or driver $e^2$. The latter is located between the two guideways, and its reduced ends $e^3$ fit between the spaced-apart posts of said guideways. As the upright is being raised by the winding of the rope on the drum the arm E occupies an inclined position, and as said upright approaches the upper limit of its movement the hooked end of said arm is disengaged therefrom by the outer end contacting with one of the plates $b^4$, causing said arm to turn on the pivot of its bail. The downward movement of the weight is limited by contact with two parallel rods $e^4$ extending between and supported by the two guideways.

In practice the post or pile to be driven home is sandwiched between the bars of the platform and the upright guideways, the rods $e^4$ also serving to steady the same. The raising of the weight is effected by the winding of the rope, and its descent will drive the post or pile into the earth. The machine is moved from post to post when employed in the construction of a fence, the forward brace-plate $a^7$ being first removed after the machine is positioned with the post between the guideways. In order to always maintain the guideways in a vertical or truly perpendicular position, at no matter what inclination the platform may be positioned, I have provided a series of four adjusting-braces F. These braces at their lower ends are rigidly secured to the platform, and at their upper ends are loosely attached to the guideways, preferably by eyes $f$. Each brace is composed of two parts or straps $f'$ $f^2$, the former having a hole or opening $f^3$ and the latter a series of such holes or openings $f^4$, through any one of which and the hole $f^3$ is designed to be inserted a securing-pin $f^5$. The overlapping portions of these parts or straps are further held together, as against lateral movement, by looped rods $f^6$. Each of these rods at its lower end is held by the overturned end $f^7$ of strap $f'$, and after being bent around over strap $f^2$ extends upwardly parallel with the edges of said straps, and is then again bent over the straps and its upper end $f^8$ is bent back of the strap $f'$. By adjusting these parts or straps of each brace the pivoted guideways can be made to always occupy a perpendicular position, even though the platform is on hilly or uneven ground. To aid in anchoring the platform a V-shape bail G extends from one side thereof and supports at its outer end or vertex an anchoring-pin $g$.

The advantages of my invention are apparent to those skilled in the art to which it appertains. It will be specially noted that I have provided an extremely simple and inexpensive post or pile driver suitable for operating on posts of varying diameter, and that even on uneven ground the guideways will always maintain an upright position.

I claim as my invention—

1. The herein-described pile-driver comprising the base or platform composed of two parallel bars, adjustable connections between said bars, vertical guideways connected at their lower ends to said bars, adjustable connections between said guideways, a weight movable in said guideways, and means for operating the same, substantially as set forth.

2. The herein-described pile-driver comprising the base or platform composed of two parallel bars, brace-plates adjustably connecting said bars, vertical guideways secured at their lower ends to said bars, adjustable connections between said guideways, a weight movable in said guideways, an operating rope or chain designed to be connected to said weight, a drum mounted in one of said brace-plates and to which the other end of said rope or chain is connected, and an operating crank-shaft, substantially as set forth.

3. A post or pile driver comprising a base or platform composed of two parallel bars adjustably connected together, parallel guideways pivotally connected at their lower ends to said base or platform, adjustable connections between said guideways a series of adjustable braces connected at their ends to said guideways and base or platform, a weight movable between said guideways and means for operating the same, whereby said guideways can be adjusted to always occupy a perpendicular position, substantially as set forth.

4. A post or pile driver comprising a base or platform, parallel guideways loosely mounted on said base or platform composed of two parallel bars adjustably connected together and extending upwardly therefrom, a series of inclined braces loosely connected at their upper ends to said guideways and attached at their lower ends to said base or platform, each of said braces consisting of two overlapping parts or straps having holes or openings therein, pins designed to be inserted through said holes or openings, and guide-loops engaging both of said parts or straps at their overlapping portions, substantially as set forth.

5. A post or pile driver comprising a base or platform, parallel guideways loosely mounted on said base or platform and extending upwardly therefrom, a series of inclined braces connected at their ends to said base or platform and to said guideways, each of said braces consisting of two parts or straps one having a hole or opening and the other having a series of holes or openings, a securing-pin, and a rod secured to the end of one of said parts or straps and having upper and lower loop portions overlapping said parts or straps, substantially as set forth.

6. The herein-described pile-driver comprising the base or platform composed of two spaced-apart parallel bars, adjustable plates connecting said bars, vertical guideways secured at their lower ends to said bars, adjustable connections between said guideways, adjustable brace-plates supporting said guideways, a weight movable between said guideways, an operating-rope, and a drum to which said rope is connected mounted in one of said brace-plates, substantially as set forth.

7. The combination with the base or platform, of the vertical guideways adjustable relatively to each other, a stop at the upper ends thereof, the weight having an eye and also having reduced portions fitting within said guideways, the operating rope or chain, the arm having a hooked end to engage said eye, and a bail pivotally connected to said arm adjacent to said hooked end and to which said rope or chain is connected, said arm being disengaged from said weight upon contact with said stop, substantially as set forth.

8. The combination with the base or platform, of the vertical guideways adjustable relatively to each other, the cross-plate connecting said guideways, the weight movable between said guideways having an eye and also having reduced portions fitting within said guideways, the curved arm having a hooked end designed to engage said eye, the rope or chain connected to said arm adjacent to said hooked end, the pulley over which said rope or chain is passed, and the operating-drum to which said rope or chain is connected, as set forth, said arm being disengaged from said weight upon contact with said cross-plate, as stated.

9. The herein-described post or pile driver comprising the base or platform having spaced-apart bars, an anchor-pin carried by said base or platform, a series of brace-plates connecting said bars, one of said brace-plates having a central looped portion, a drum located in said looped portion and having an operating crank-shaft, vertical guideways loosely connected at their lower ends to said base or platform, a cross-plate near the upper ends of said guideways, a series of adjustable braces connected to said base or platform and to said guideways, a weight movable in said guideways having an eye, an arm having a hooked end to engage said eye, a bail pivoted to said arm, a cross-rod between said guideways, a pulley supported thereby, and an operating rope or chain passed over said pulley and connected at one end to said bail, its other end being connected to said drum, substantially as set forth.

In testimony whereof I have signed this specification in the presence of two subscribing witnesses.

GEORGE WASHINGTON CRUMLY.

Witnesses:
C. A. HIGHT,
J. A. GLOVER.